Feb. 16, 1971 R. A. MICHAUD 3,564,520

MAGNETIC HEAD ASSEMBLY

Filed Dec. 2, 1963 2 Sheets-Sheet 1

ROBERT A. MICHAUD
INVENTOR.

BY Stuart Lubitz

ATTORNEY

Feb. 16, 1971 R. A. MICHAUD 3,564,520

MAGNETIC HEAD ASSEMBLY

Filed Dec. 2, 1963 2 Sheets-Sheet 2

ROBERT A. MICHAUD
INVENTOR

BY Stuart Lubitz

ATTORNEY 3,564,520

MAGNETIC HEAD ASSEMBLY

Robert A. Michaud, Sunnyvale, Calif., assignor to Ampex Corporation, Redwood City, Calif., a corporation of California Filed Dec. 2, 1963, Ser. No. 327,349
Int. Cl. G11b 5/16, 5/28, 5/42
U.S. Cl. 340—174.1 10 Claims

ABSTRACT OF THE DISCLOSURE

This invention relates to a magnetic head assembly and to a method for manufacturing such an assembly. More particularly this invention relates to a longitudinal type of magnetic head assembly wherein a metal body includes an internal cavity with a radiused groove surface which receives a radiused core having substantially the same radius of curvature as the groove surface.

In the past, longitudinal magnetic head assemblies have been constructed by placing a plurality of cores in some sort of holding device or fixture with or without a supplementary holding device and then potting the cores (and the supplementary holding device) to form an assembly. Typical prior art head assemblies and methods for forming these assemblies are shown in U.S. Pat. 2,915,812 issued to Rettinger on Dec. 8, 1959 and U.S. Patent 2,888,522 issued to McCutchen, Jr., et al. on May 26, 1959. These prior art techniques require sophisticated holding fixtures, a plurality of holding devices and are not compatible with longitudinal head assemblies having a large number of closely spaced cores.

The general object of this invention is to provide an improved magnetic head assembly and method for fabricating such an assembly.

Another object of this invention is to provide an improved longitudinal head assembly.

Another object of this invention is to provide an improved longitudinal head assembly that may be readily manufactured.

Another object of this invention is to provide a longitudinal magnetic head assembly that is compatible with a high density core arrangement.

Another object of this invention is to provide a longitudinal magnetic head assembly that can be assembled with a minimum of additional fixtures.

Another object of this invention is to provide a longitudinal magnetic head assembly wherein the cores may readily be positioned and located.

Another object of this invention is to provide a method for assembling magnetic heads that involves a minimum of special fixtures.

These and other objects and advantages will be fully appreciated when the detailed description is read in conjunction with the drawings wherein.

In essence the invention comprises singularly or gang cutting a plurality of circular slots or grooves in a body or metal body that forms a part of the head assembly. The width of the grooves is selected to receive a core or laminated magnetic core which includes a transducing gap. The radius of the grooves corresponds to the radius of the cores so that all the cores placed in the grooves are positioned at a proper depth for finishing or lapping and with respect to the face of the magnetic head assembly. The complementary radii of the core and the groove also permit angular adjustment of the core relative to the groove.

Figures 1, 2, 3, 4:
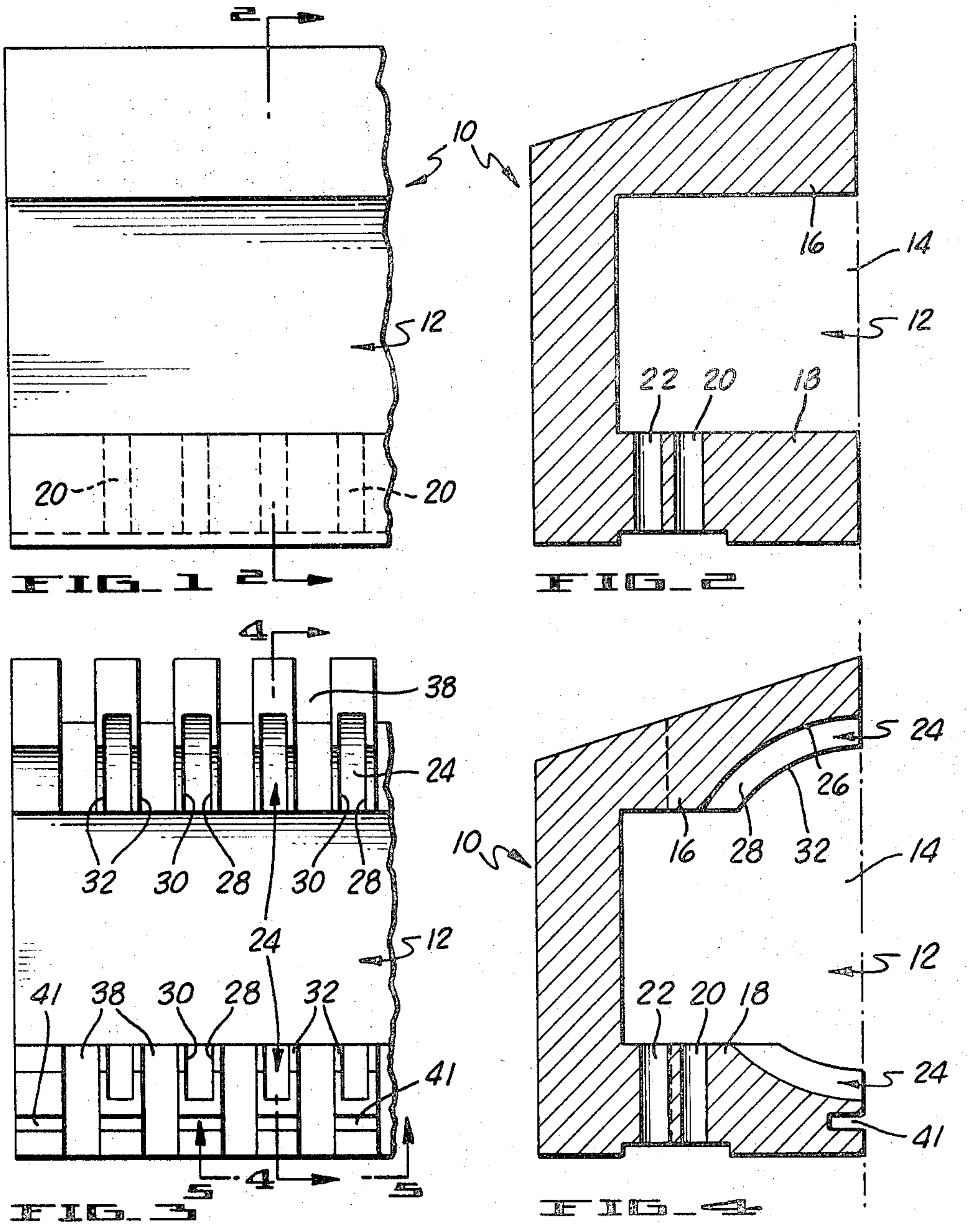
FIG. 1 is a front view of a portion of a magnetic head assembly during the initial stages of manufacture.
FIG. 2 is an elevational section taken along the lines 2—2 of FIG. 1.
FIG. 3 is front view of a portion of the magnetic head assembly following the cutting of the grooves which receive the shields and the cores.
FIG. 4 is a side sectional elevation taken along the lines 4—4 of FIG. 3.

More specifically referring to FIGS. 1 and 2, a body or side piece 10 having an internal cavity 12 is the building block from which the magnetic head assembly is formed. The body 10 may be formed from aluminum, other metals, plastic, or ceramic. The internal cavity 12 has an opening 14 that eventually forms an opening for receiving the magnetic cores or halves of the magnetic cores. The internal cavity 12 is bounded by a pair of surfaces or walls 16 and 18 that may be parallel. The surface 16 will eventually have an opening or openings therein which permits the transducing gap to cooperate with the magnetic tape that passes over the face of the head assembly. The internal cavity as shown, has rectangular form. It, of course, may be circular or any other shape that can be conveniently formed.

The body 10 and its internal cavity 12 may be formed by casting from an extrusion, by milling or by sintering. If casting or sintering the body 10 may include a circular bore such as 32 (FIG. 4) or the bore 32 may be placed in the body 10 by a subsequent milling operation with a radius cutter or ball end mill. It is within the scope of the invention to first mill the bore 32 and then end mill the rectangular portion of the cavity.

Following the forming of the body 10 (FIGS. 1 and 2), it is placed in a milling machine, lathe or other machine so that a plurality of grooves or groove surfaces such as the groove surfaces 24 having circular arcs 26 may be cut therein. The groove surfaces 24 may be cut singly or gang cut by a fly cutter, lathe, or slitting saw. When formed, the groove surfaces 24 are bounded by a pair of parallel spaced-apart side walls 28 and 30. The width of the groove surfaces 24 is the same as the width of the cores that are eventually placed between the side walls 28 and 30. In other words the side walls 28 and 30 are spaced according to the width of the core or laminated core stack. The circular arcs of the groove surfaces 24 have a radius curvature that is approximately equal to the radius of the curvature of the cores. This complementary radiusing of the cores and the groove surfaces 24 facilitates the positioning of the cores relative to the face 31 (FIG. 7) of the head assembly and results in all of the cores in the longitudinal head assembly being positioned in precisely the same manner. The face 31 of the head assembly cooperates with the magnetic tape.

Figure 5:
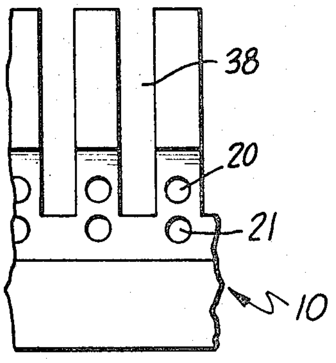
FIG. 5 is a bottom view taken along lines 5—5 of FIG. 3.

Following the cutting of the groove surfaces 24, additional grooves or slots are cut for receiving the interchannel magnetic shields that reduces magnetic of electrostatic cross-talk caused by the adjacent cores and their associated coils and caused by the adjacent tracks of information on the recorded medium. The grooves 38 (FIG. 3) for the shields may be formed like the grooves 24 that receive the cores or the grooves 38 may be formed by cutting a channel through the entire body 10. It is this later form of channel that is shown in FIGS. 3, 4 and 5. These channels or grooves 38 may be formed by a fly cutter, lathe or slitting saw. A recess 41 is formed in the body 10 to receive a stop member 43 (FIG. 6) that may take the form of a slab of Bakelite. The stop member 43 functions as a stop for the shields so that they are accurately positioned relative to one another and relative to face of the magnetic head assembly. Once the shield channels 38 are formed, the body 10 is ready to receive the cores.

Figure 6:
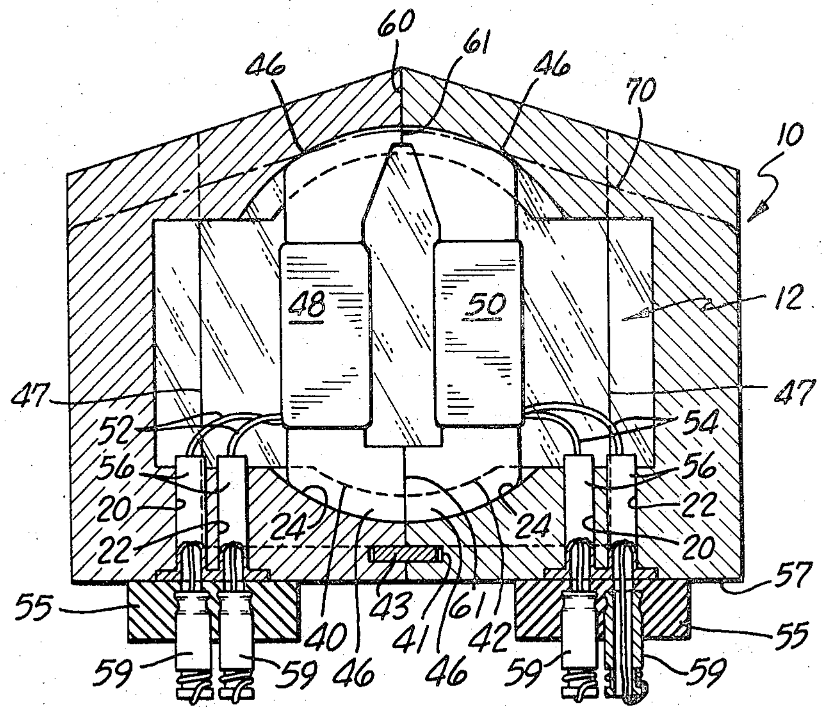
FIG. 6 is a side sectional view of the assembled longitudinal magnetic head assembly before the finishing operation.

It should be understood that two of the bodies or side pieces 10 must be prepared to form a complete longitudinal head assembly (FIG. 6). The other side piece may be formed simultaneously and on the same machine that forms the first side piece or it may be formed subsequently. Once both side pieces are formed, the core halves 40 and 42 (FIG. 6) are secured in the radiused groove surfaces 24 with an epoxy or similar other adhesive. The core halves 40 and 42 may be formed from permalloy laminations that are combined into a stack to form a core halve or they may be ferrite cores formed by sintering. It is, of course, within the scope of this invention to form the core halves by other well known techniques.

The core halves 40 and 42 have radiuses 46 that are substantially identical with the radiuses of the groove surfaces 24. The coils 48 and 50 are wound around the core halves 40 and 42 and include leads 52 and 54 which pass through the body 10 via the apertures 20 and 22. The apertures 20 and 22 are adapted to receive the insulation tubing 56. Terminal boards 55 are secured to the bottom surface 57 of the body 10. The leads 52 and 54 pass through holes in the terminals 59 and are secured to these terminals by soldering or welding.

With the core halves 40 and 42 positioned in the groove surfaces 24, the surface 60 is finished, the non-magnetic gap spacer 61 may be deposited on one of the cores 40 and two side pieces or bodies 10 are brought together to form a complete longitudinal head assembly. It is also within the scope of the invention to form gaps 61 by placing very thin non-magnetic shims between the core halves 40 and 42 or by other known techniques.

When the two side pieces 10 are properly aligned, they are secured by a simple holding fixture or clamp that is readily adapted to receive many different types of longitudinal head assemblies. With the longitudinal head assembly held by a clamp the shields 47 are placed in the channels 38 and the assembly is permanently secured together to form a rigid assembly by injecting a potting compound of epoxy resin or similar material into the cavity 12 through one end of the assembly 101. The other end of the assembly 103 has a base member 102 secured to it by an epoxy adhesive or other fastening means. The potting compound will fill the interior of the longitudinal head assembly flowing between the shields 47 and the core halves 40 and 42. Once the potting compound has set, the longitudinal head assembly may be removed from the holding fixture. A cap 104 is then secured to head assembly by fastening means such as an adhesive compound. It is then only necessary to make finishing cuts along the broken line 70 in order to finish the longitudinal magnetic head assembly. This finishing operation can be accomplished by contour grinding, or lapping or by sanding, and then polishing.

Figure 7:
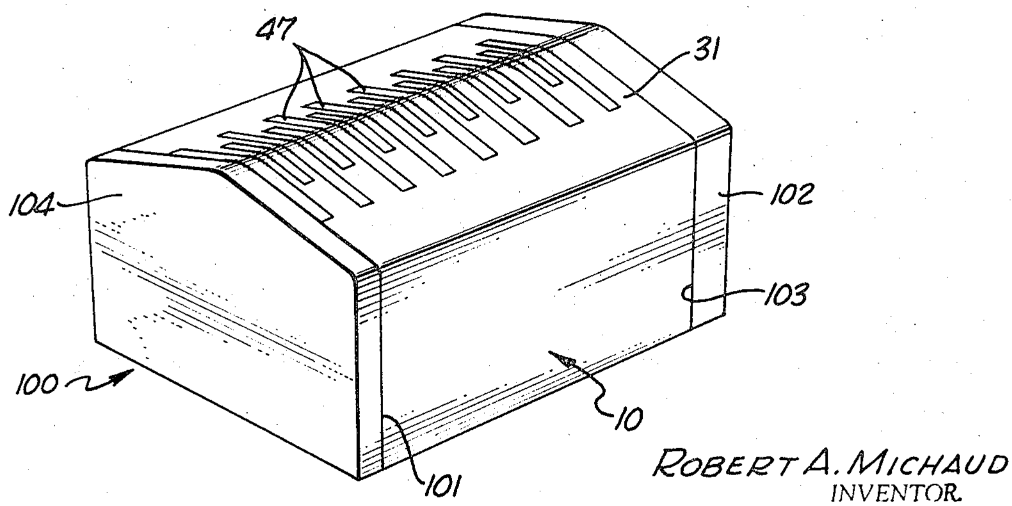
FIG. 7 is a perspective of a finished longitudinal head assembly.

Following the finishing operation, the longitudinal head assembly will appear as shown in FIG. 7. It should be noted that the longitudinal head assembly 100, as shown in FIG. 7, presents an all metal face to a magnetic tape when the side pieces 10 are made from metal. In the finished assembly the gaps 61 project through openings that communicate with the internal cavity 12. The base 102 and the cap 104 facilitate the mounting of the head assembly in the record and reproduce apparatus.

In certain cases a particularly advantageous combination is achieved by making the side pieces from ceramic, and the cores from ferrite. This assembly may be secured by an appropriate sintering operation.

In summary a longitudinal magnetic head assembly is provided with an internal cavity that includes radiused groove surfaces separated by substantially parallel walls. The radiused groove surface have substantially identical radius of curvature as the cores or core halves which are eventually secured to the radius groove surfaces. The width of the radiused grooves is essentially the same width as the radiused core halves. The core halves and the finally formed cores 40 and 42 are separated by interchannel magnetic shields that are also received in the body or side pieces of the assembly by properly formed channels.

The invented magnetic head assembly is easily manufactured, requires a minimum of special fixtures for assembly, is adapted to readily position the cores relative to one another and relative to the face of the head assembly and presents an all metal face to a magnetic tape. The invented head assembly also provides a structural configuration which enables the cores 40 and 42 to be closely spaced.

While the above detailed description has shown, described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the invention, therefore, to be limited only as indicated by the scope of the following claims.

What is claimed is:

1. A magnetic head assembly having a magnetic tape bearing surface, comprising:

a body having an internal cavity bounded at least in part by a pair of parallel spaced apart walls, said body having a spaced plurality of arcuate grooves formed in the walls thereof, the arcuate grooves disposed to face inwardly toward the center of the cavity;

said body also having a plurality of channels formed in the walls thereof in alternate disposition relative to the arcuate grooves;

a plurality of magnetic transducer cores having gaps therein disposed within the body and abutting at either end thereof against respective arcuate grooves;

said cores having radiused ends formed thereon wherein the radii of curvature thereof are substantially equal to the radii of curvature of the arcuate grooves;

magnetic shield means disposed within the plurality of channels;

said cores being inserted within the cavity and against the arcuate grooves to position and support the cores in relative alignment, whereby the gaps thereof are rendered in alignment along a common plane.

2. The structure recited in claim 1 wherein the widths of the cores are substantially equal to the widths of the arcuate grooves, and the arcuate grooves abutting the radiused ends of the cores opposite the gap ends thereof extend continuously along arcs therewith to provide continuous support for said radiused ends.

3. A magnetic recording head according to claim 1 wherein the entire cavity is filled with potting material to hold said core in place within said body.

4. The magnetic head assembly of claim 1 wherein the body is formed of a substantially rectangular smooth block of material.

5. The magnetic head assembly of claim 1 wherein said body walls are of sufficient material thickness to allow internally forming therein the plurality of arcuate grooves against which the radiused ends of the cores are disposed.

6. The magnetic head assembly of claim 5 wherein the thicknesses of the body walls are at least of the order of one half the radius of curvature of the arcuate grooves.

7. The magnetic head assembly of claim 2 wherein the radiused ends of the cores in which the gaps are located abut against and are supported along outermost minor arcuate portions thereof bearing against portions of the arcuate grooves, the remaining portions of the radiused ends of the cores including the gaps being exposed in substantially flush relation within the magnetic bearing surface of the respective body wall.

8. The magnetic head assembly of claim 2 wherein the magnetic shield means further comprise a plurality of substantially rectangular sheets of magnetic shielding material disposed within the plurality of channels to magnetically isolate each core, said sheets extending to lie substantially flush with the cores along said magnetic tape bearing surface and substantially beyond the cores along the entire remaining periphery thereof within the body.

9. The structure recited in claim 4 wherein said body is made from a non-magnetic metallic material and said cores are made from a ferrite material wherein said magnetic tape bearing surface is an all metal surface.

10. The structure recited in claim 4 wherein said body is made from a non-metallic material taken from the group consisting of ceramics and plastics.

References Cited

UNITED STATES PATENTS

| | | | |
|---|---|---|---|
| 2,618,709 | 11/1952 | Eckert | 179—100.2 |
| 3,211,843 | 10/1965 | Dundovic | 179—100.2 |
| 3,271,843 | 9/1966 | Vice | 29—428 |
| 3,349,193 | 10/1967 | Vice | 179—100.2 |

FOREIGN PATENTS

| | | | |
|---|---|---|---|
| 802,396 | 10/1958 | Great Britain | 340—174.1 |

TERRELL W. FEARS, Primary Examiner

U.S. Cl. X.R.

179—100.2; 346—74